(12) United States Patent
Finch et al.

(10) Patent No.: US 10,385,894 B2
(45) Date of Patent: Aug. 20, 2019

(54) SPLIT RING ATTACHING AND RESTRAINING DEVICE AND METHOD

(71) Applicant: SPX FLOW, INC., Charlotte, NC (US)

(72) Inventors: Derek Ian Finch, Goldsboro, NC (US); Neil Edwin Jarman, Snow Hill, NC (US); James Cecil, Goldsboro, NC (US)

(73) Assignee: SPX FLOW, INC., Charlotte, NC (US)

( * ) Notice: Subject to any disclaimer, the term of this patent is extended or adjusted under 35 U.S.C. 154(b) by 120 days.

(21) Appl. No.: 15/271,932

(22) Filed: Sep. 21, 2016

(65) Prior Publication Data

US 2018/0080723 A1   Mar. 22, 2018

(51) Int. Cl.
| | | |
|---|---|---|
| F28F 9/14 | (2006.01) |
| F16B 2/06 | (2006.01) |
| F28F 9/10 | (2006.01) |
| F28F 9/12 | (2006.01) |
| F16L 33/04 | (2006.01) |
| F16B 7/04 | (2006.01) |

(52) U.S. Cl.
CPC .............. *F16B 2/06* (2013.01); *F16B 7/0426* (2013.01); *F16L 33/04* (2013.01); *Y10T 24/1441* (2015.01); *Y10T 24/1486* (2015.01)

(58) Field of Classification Search
CPC ...... F16B 2/06; F16B 7/0426; Y10T 24/1441; Y10T 24/1443; Y10T 24/1486; Y10T 403/5786; Y10T 403/69; F16L 33/04
See application file for complete search history.

(56) References Cited

U.S. PATENT DOCUMENTS

| | | | | | |
|---|---|---|---|---|---|
| 3,609,826 A | * | 10/1971 | Seabourn | ............... | B65D 63/02 24/279 |
| 3,977,705 A | * | 8/1976 | Thiessen | ............... | F16L 17/073 285/112 |
| 4,116,572 A | * | 9/1978 | Heldmann | .............. | F16B 2/065 403/344 |
| 4,217,061 A | * | 8/1980 | Eiland | ....................... | F16D 1/04 403/313 |
| 4,428,697 A | * | 1/1984 | Ruland | ................. | F16D 1/0864 403/290 |
| 4,822,077 A | * | 4/1989 | Hendrickson | ........... | F16L 17/04 285/112 |
| 5,062,734 A | * | 11/1991 | Vanzee | ................... | B23P 13/02 403/302 |

(Continued)

*Primary Examiner* — Robert Sandy
*Assistant Examiner* — Rowland Do
(74) *Attorney, Agent, or Firm* — BakerHostetler

(57) ABSTRACT

A split ring includes a split ring body, the body having a first end and a second end; a first fastener hole defined by the first end of the split ring; a second fastener hole defined by the second end of the split ring; a gap defined by the first and second ends approaching each other wherein the first fastener hole and the second fastener hole are aligned to permit a fastener to extend through the first fastener hole, across the gap and through the second fastener hole; and a protrusion extending beyond the body of the split ring, the protrusion being located on the body opposite the gap. A method of forming a split ring includes: forming a split ring body; fixing onto the body a projection that projects above the body; and installing a closing mechanism into the split ring in order to allow the split ring to tighten over an object.

18 Claims, 9 Drawing Sheets

(56) References Cited

U.S. PATENT DOCUMENTS

| | | | | |
|---|---|---|---|---|
| 5,197,177 A | * | 3/1993 | Gieger | F16L 41/001 |
| | | | | 239/600 |
| 6,413,006 B1 | * | 7/2002 | Neugart | F16D 1/0864 |
| | | | | 403/290 |
| D769,384 S | * | 10/2016 | Altemus, Jr. | D21/753 |
| 2005/0079012 A1 | * | 4/2005 | Mochizuki | F16B 5/025 |
| | | | | 403/408.1 |
| 2008/0282514 A1 | * | 11/2008 | Van Walraven | F16L 3/1016 |
| | | | | 24/279 |
| 2010/0083473 A1 | * | 4/2010 | Mieszelewicz | F16L 41/06 |
| | | | | 24/279 |
| 2012/0200083 A1 | * | 8/2012 | Krueger | F16B 35/041 |
| | | | | 285/420 |
| 2012/0230758 A1 | * | 9/2012 | Widenmeyer | F16D 1/0847 |
| | | | | 403/290 |

* cited by examiner

SPLIT RING ATTACHING AND RESTRAINING DEVICE AND METHOD

TECHNICAL FIELD

The present disclosure relates generally to a device and method for attaching and restraining a tube or pipe to a wall. More particularly, the present disclosure relates to a method and apparatus for restraining a nozzle installed in the wall of a heat exchanger.

BACKGROUND

Plate heat exchangers often use nozzles that are attached to a head or follower sometimes referred to as slabs (or fixed and moveable plates). It is often desirable to attach the nozzles to the slabs so that they may resist movement with respect to the slabs in several directions. For example, it may be undesirable to have the nozzle move axially with respect to the nozzle through the slab. It may also undesirable to have the nozzle move with respect to the slab in a rotational direction about the axis of the nozzle. Further, it may be desirable to have the nozzle secured the slab in such a way as the nozzle resists a moment put on the nozzle in a direction parallel to the surface of the slab.

In some designs, the nozzles are attached to the slabs by welding. While welding may work well in resisting axial movement, rotation and moments, welding can be expensive and suffers other drawbacks.

Accordingly, it is desirable to provide a method and apparatus that allows a nozzle installed in the slab of a heat exchanger to resist axial movement, rotational movement and a moment in a direction parallel to the surface of the slab without having the drawbacks of welding.

SUMMARY

The present disclosure describes a method and apparatus that allows a nozzle installed in the slab of a heat exchanger to resist axial movement rotational movement and a moment in a direction parallel to the surface of the slab without having the drawbacks of welding.

The present disclosure also describes a split ring. The split ring includes: a split ring body, the body having a first end and a second end; a first fastener hole defined by the first end of the split ring; a second fastener hole defined by the second end of the split ring; a gap defined by the first and second ends approaching each other where the first fastener hole and the second fastener hole are aligned to permit a fastener to extend through the first fastener hole, across the gap and through the second fastener hole; and a protrusion extending beyond the body of the split ring, the protrusion being located on the body opposite the gap.

The present disclosure also describes a method of forming a split ring. The method may include: forming a split ring body; fixing on the body a projection that projects above the body; and installing a closing mechanism into the split ring in order to allow the split ring to tighten over an object.

The present disclosure also describes a split ring. The split ring may include: a split ring body, the body having a first end and a second end; a first fastener hole defined by the first end of the split ring; a second fastener hole defined by the second end of the split ring; a gap defined by the first and second ends approaching each other wherein the first fastener hole and the second fastener hole are aligned to permit a fastener to extend through the first fastener hole, across the gap and through the second fastener hole; and a protrusion extending beyond the body of the split ring, the protrusion being located on the body opposite the gap.

DETAILED DESCRIPTION

Figure 1:
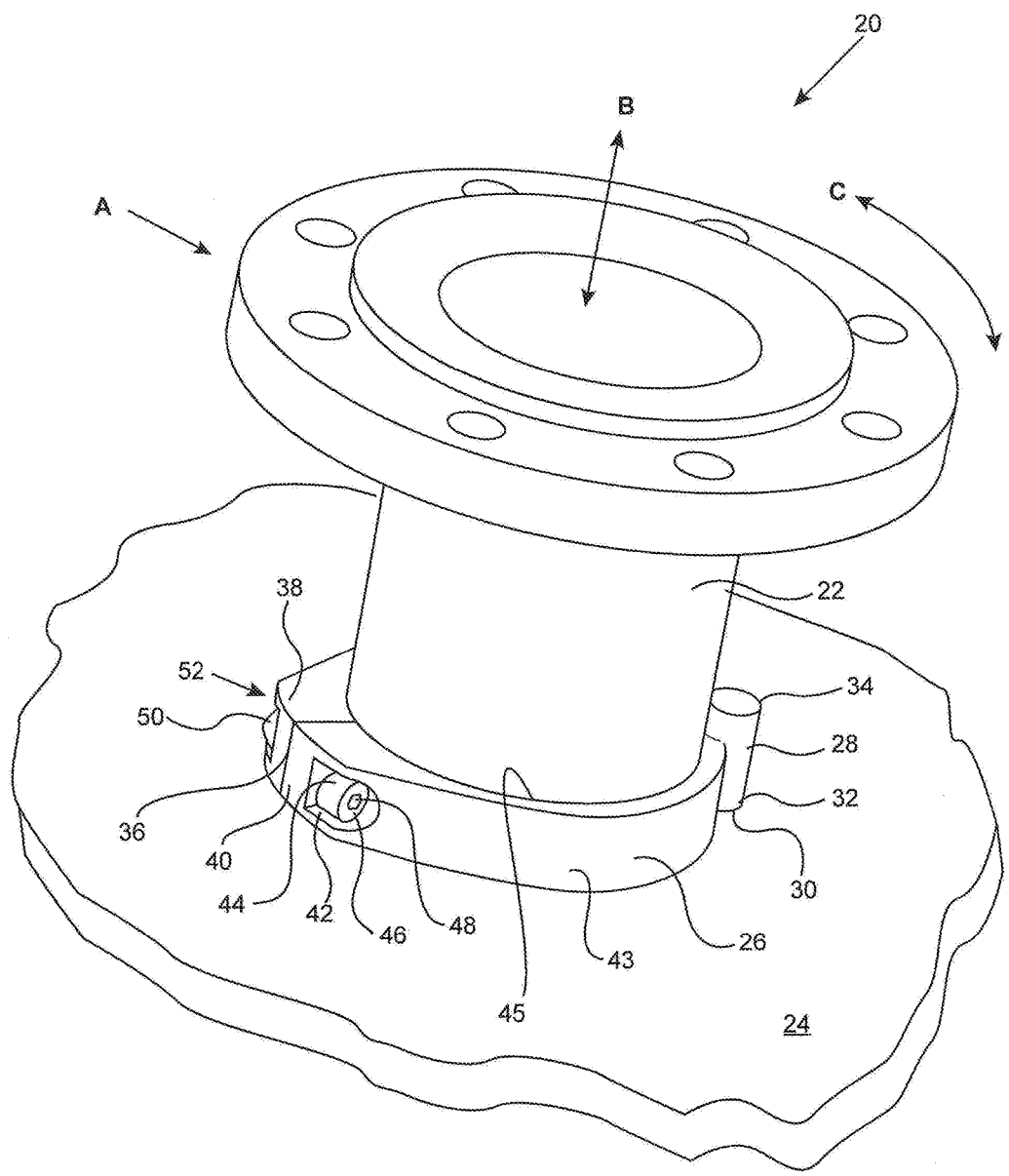
FIG. 1 is a perspective view illustrating a nozzle attached to a heat exchanger using a split ring in accordance with the present disclosure.

Various embodiments will now be described with reference to the drawing figures, in which like reference numerals refer to like parts throughout. An embodiment in accordance with the present disclosure provides a system and method for attaching and restraining a nozzle in a plate heat exchanger.

An embodiment of the described apparatus is illustrated in FIG. 1. FIG. 1 illustrates a portion of a heat exchanger 20 having a nozzle 22 attached to a plate 24. The nozzle 22 is restrained in the plate 24 via a split ring 26. An extension 28 is attached to the split ring 26. The extension 28 fits into a reception hole 30 in the plate 24. The fact that the extension 28 fits into the reception hole 30 prevents the split ring 26 from rotating about the nozzle 22. In some embodiments, and as shown in FIG. 1, the extension 28 has a first end 32 which is placed into the hole 30 and a second end 34 which extends above the body of the split ring 26. The split ring 26 has a split 36. As a result of the split 36, the split ring 26 has a first end 38 end a second end 40.

A fastener head hole 42 is located on the second end 40 of the split ring 26. The fastener head hole is sized and dimensioned to allow the fastener 44 to fit through the fastener head hole 42 and stop the fastener head 46 from entering the fastener hole 54 best shown in FIG. 3. In the embodiment shown in FIG. 1, the fastener head hole 42 is located on the outer surface 43 of the split ring 26. The inner surface 45 of the split ring 26 is pressed against the nozzle 22.

The fastener head 46 is equipped with fastener attaching structure 48. In the embodiment shown, the fastener attaching structure 48 is a hex hole but other attaching structure 48 may be used such as a flat slot for coupling with a standard screwdriver, a cross slot for coupling with a Phillips screwdriver, flats located on the outer circumference of the fastener head, or any other suitable fastening structure. The fastening attaching structure 48 may be used to allow a tool, such as a screwdriver, wrench, Allen wrench, or any other tool used for turning a fastener to attach to the fastener 44 to turn the fastener 44.

In some embodiments, turning the fastener 44 one way will cause the first end 38 of the split ring 26 to move toward the second end 40 of the split ring 36. In some embodiments, turning the fastener 44 in the opposite direction will cause the first end 38 of the split ring 26 to move away from the second end of the split ring 26. The fastener 44 may be equipped with a fastener nut 50. The fastener 44 may threadably engage the fastener nut 50 in order to move the first end 38 of the ring 26 toward or away from the second end 40 of the split ring 26.

In the embodiment shown in FIG. 1 and described herein, the split ring 26 helps in restraining the nozzle 22 in the plate 24 in such a manner that the nozzle 22 will resist a moment that may be substantially parallel with the outer surface of the plate 24 as illustrated by arrow A. Arrow A is not meant to be an exhaustive representation of all the moments that may be exerted on the nozzle but merely an example moment. Furthermore, the nozzle 22 is mounted to the plate 24 in a way as to resist axial movement in only one axial direction represented by the upward pointing arrowhead of arrow B. The resistance to this unidirectional axial movement is provided by a flange 82 associated with the nozzle 22 shown in FIG. 8 and discussed below. Resistance to axial movement in the opposite direction is represented by the downward pointing arrowhead of arrow B is provided by the split ring 26. Furthermore, it will be appreciated by one of ordinary skill in the art after reviewing this disclosure, that the extension 28 helps the nozzle 22 to resist rotation about the axis of the nozzle 22 as illustrated by arrows C. As a result, the fastening or securing system described herein allows the nozzle 22 to be firmly attached to the plate 24.

Figure 2:
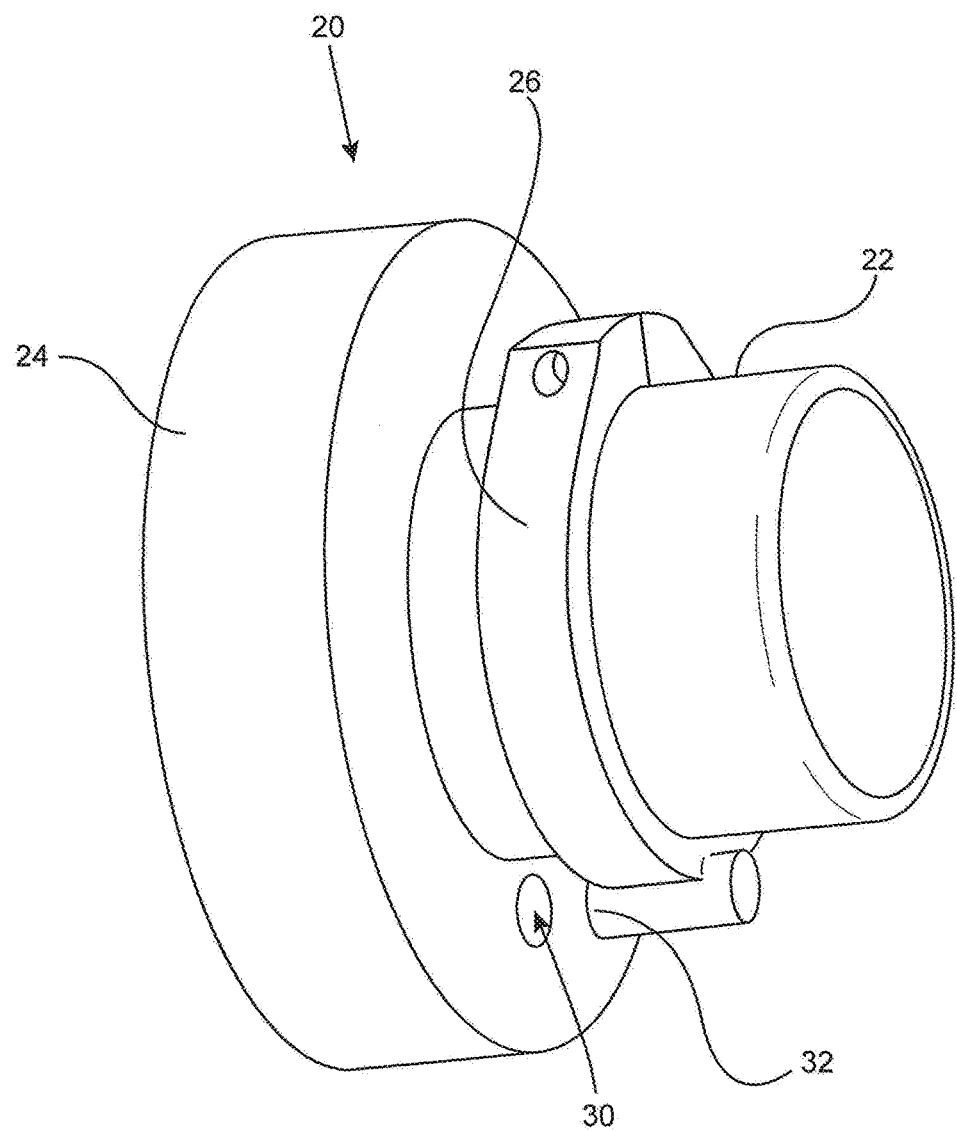
FIG. 2 is a perspective view illustrating a nozzle attached to a heat exchanger where the split ring is not yet fully in place.

FIG. 2 illustrates the split ring 26 mounted to the nozzle 22. The split ring 26 is spaced away from the plate 24 in order to better show how the first end 32 of the extension fits in the reception hole 30 in the plate 24. It should be understood that a small circular portion of the much larger plate 24 is shown and that the portion of the plate 24 should not be mistaken for a flange.

In some embodiments using split rings 26, the split ring 26 is placed against the plate 24 in order to allow the first end 32 to fit within the reception hole 30 in the plate 24.

It will be appreciated that the first end 32 of the extension 28 extending into the reception hole 30 will prevent the split ring 26 from rotating about the axis of nozzle 22. It will be further appreciated that the split ring 26 may be symmetrical so that if the split ring 26 is put on the nozzle 22 backwards, the second end 34 of the extension 28 will extend into the reception hole 30 and prevent rotation of the split ring 26 about the axis of the nozzle 22 and function just as the first end 32. It will be understood by those with skill in the art that once the split ring 26 is installed with the extension 28 located in the reception hole 30, the split ring 30 will be immoveable with respect to the nozzle 22. Therefore, preventing rotation of the split ring 26 prevents rotation of the nozzle 22.

Various embodiments allow for the fastener 44 to fit within the split ring 26 in various ways. Various example embodiments will be discussed with respect to FIGS. 3-7. It will be understood that the example embodiments described herein are not an exhaustive listing of all embodiments that are in accordance with the claims. Other embodiments not specifically described herein my fall within the claims attached hereto.

Figure 3:
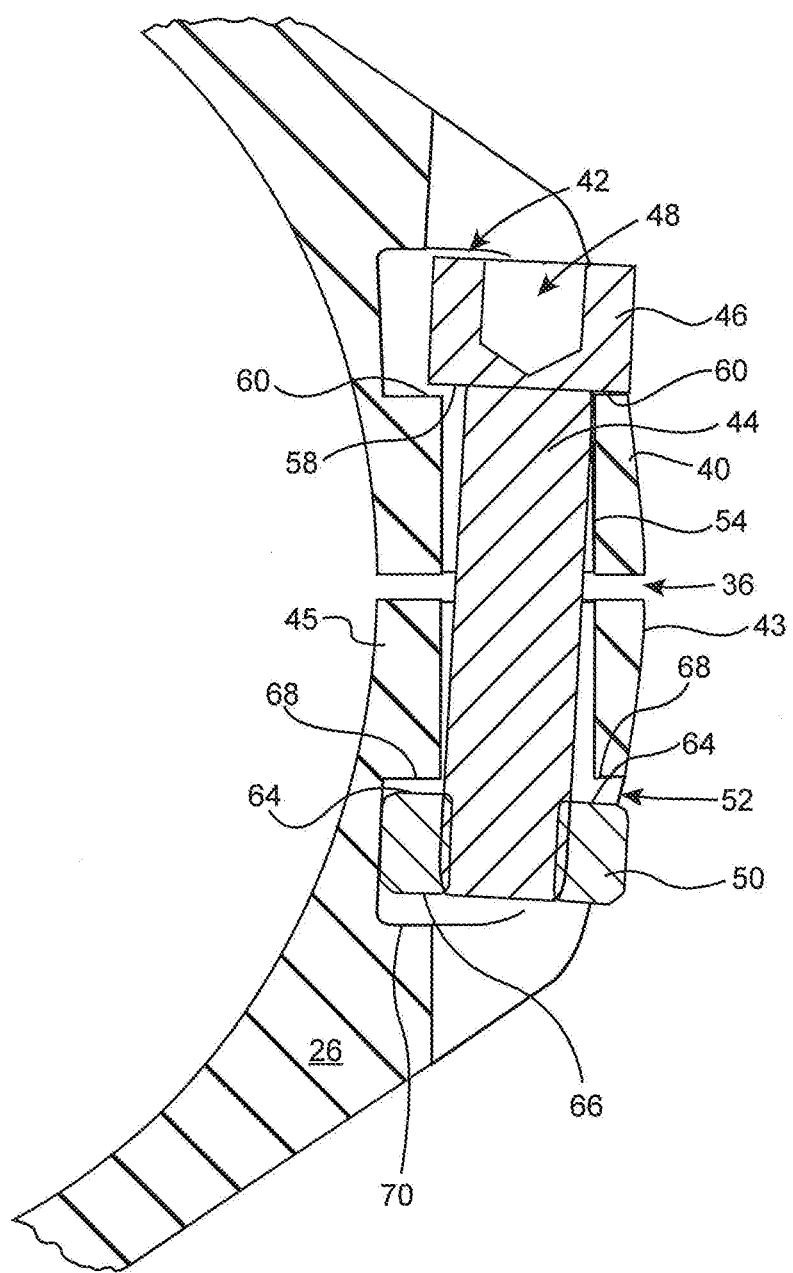
FIG. 3 is a partial, cross-sectional view showing a fastener being installed in the split ring.

As shown in FIG. 3 the fastener head hole 42, the shaft 54 of the fastener hole, and the fastener nut hole 52 are dimensioned to be larger than the fastener head 46, the fastener 44, and the fastener nut 50. By oversizing the holes 42, 52, and 54 the fastener 44 may be placed into the split ring 26 either via the fastener head hole 42 or the fastener nut hole 52.

The fastener 44 can be placed at a slight angle with respect to the fastener head hole 42, the fastener nut hole 52 and the shaft of the fastener hole 54 as shown in FIG. 3. Allowing the fastener 44 to be placed at an angle allows the fastener 44 to more easily be installed into the shaft 54 in view of the split ring 26 geometry. In some embodiments, the angle is about 5 degrees. In other embodiments the angle may be between 3 and 20 degrees.

Figure 4:
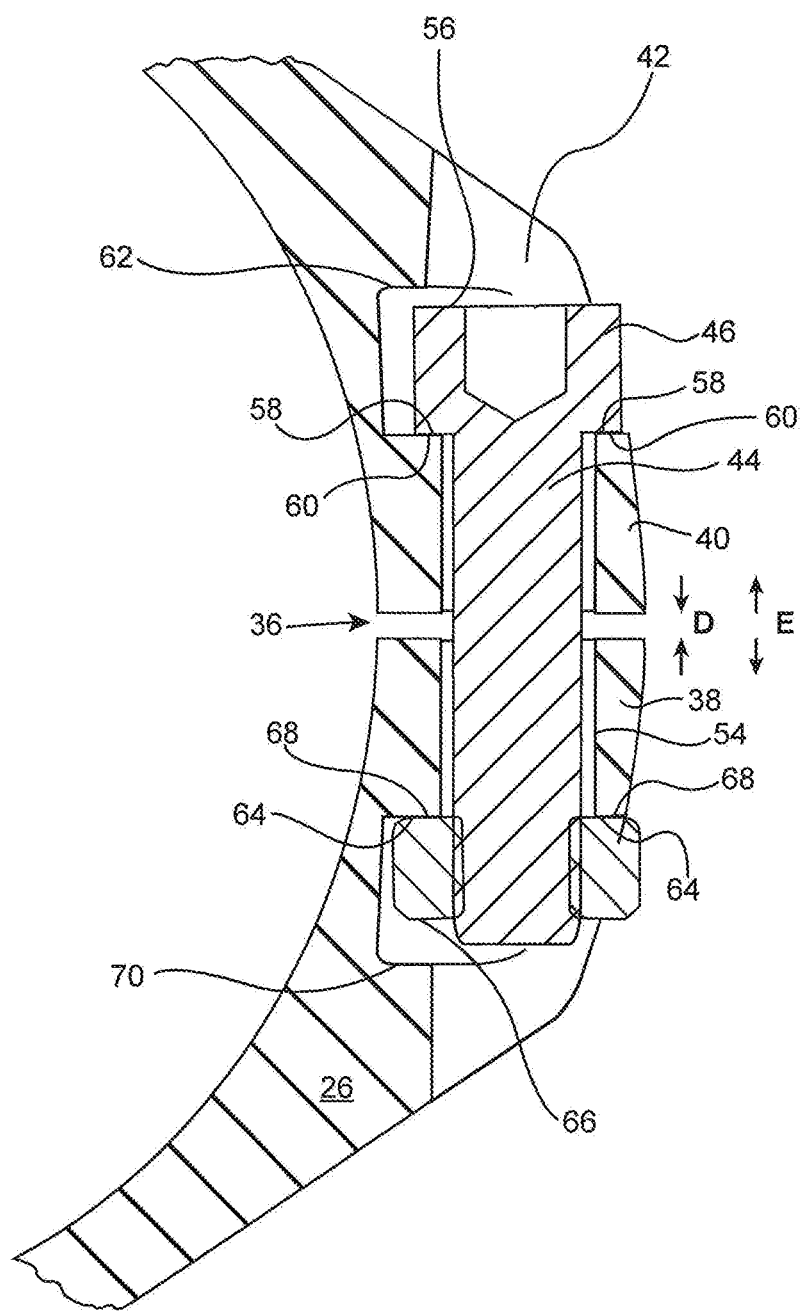
FIG. 4 is a partial, cross-sectional view showing the fastener installed in the split ring in accordance with an embodiment of the present disclosure.

The fastener nut 50 can then be attached onto the fastener 44. As the fastener nut 50 is attached and screws onto the fastener 44, the clamping surface 58 of the fastener head 46 will start to press against the clamping surface 60 of the fastener head hole 42 as shown in FIG. 4. Further, the clamping surface 64 of the nut 50 will start to press against the clamping surface 68 the fastener nut hole 52.

As the nut 50 continues to travel axially along the fastener 44, the fastener 44 will straighten in the shaft 50 of the fastener hole 54 as shown in FIG. 4. Continued tightening will result in the first end 38 of the split ring 26 to move toward the second end 40 of the split ring 26 as illustrated by arrow D in FIG. 4. The clamping surface 60 of the fastener head 54 urges against the clamping surface 58 of the fastener head hole 42. Further, the clamping surface 64 of the nut 50 urges against the clamping surface 68 of the fastener nut hole 52.

In some instances, it may be desirable to move the first end 38 of the split ring 26 away from the second end 40 of the split ring 26 prior to installation to promote easy assembly of the split ring 26 onto the nozzle 22 as illustrated by arrow E. This may be accomplished by moving the fastener 44 with respect to the fastener nut 50.

After the fastener 44 is sufficiently moved with respect to the fastener nut 44, the spreading surface 66 of the nut 50 will urge against the spreading surface 70 of the fastener nut hole 52. The spreading surface 56 of the fastener head 46 will urge against the spreader surface 62 of the fastener head hole 42. This will result in the first end 38 of the split ring 26 moving away from the second end 40 of the split ring 26.

Figure 5:
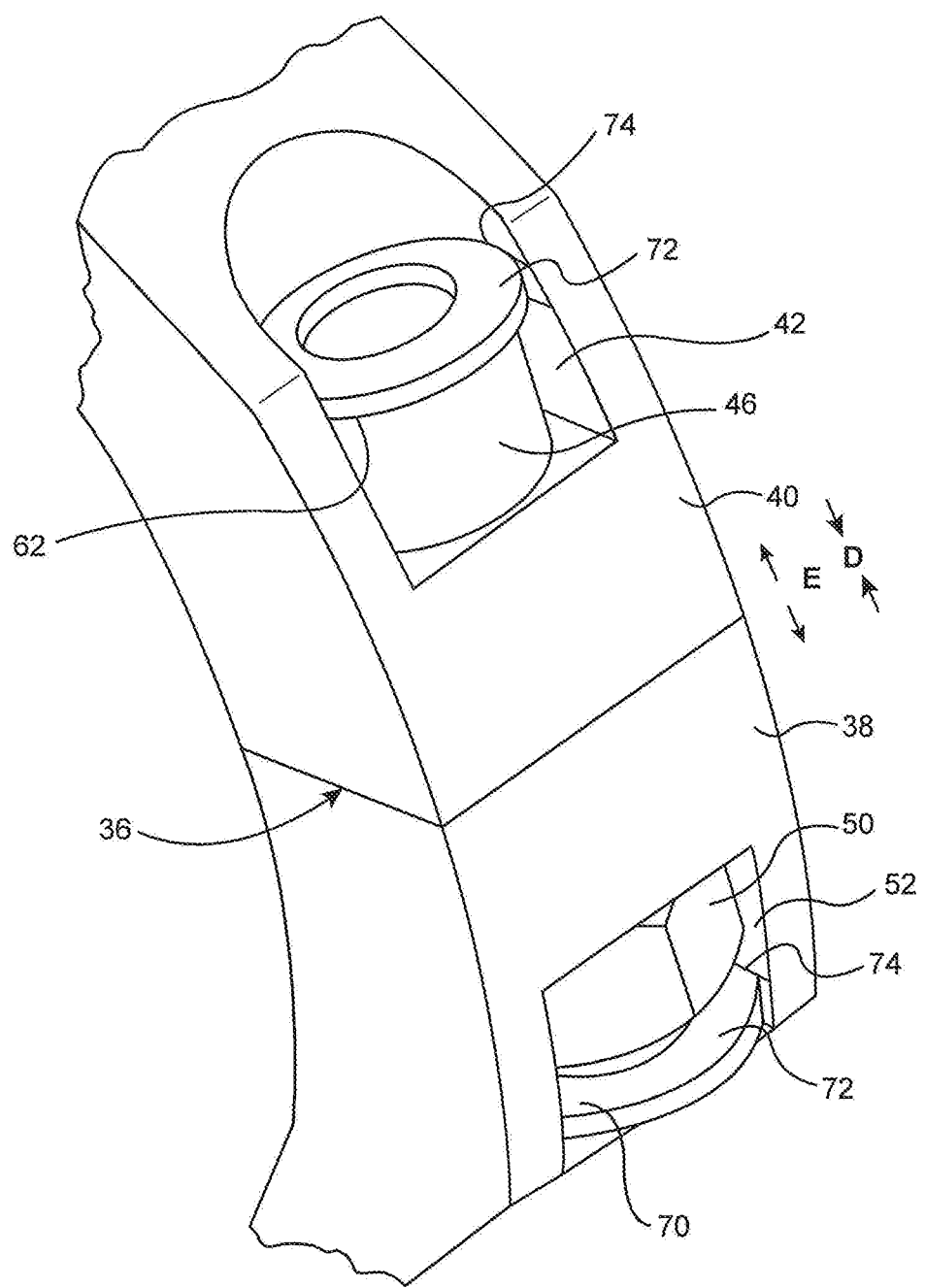
FIG. 5 is a partial, perspective view illustrating a mechanism for spreading and closing the ends of the split ring in accordance with the present disclosure.

In other embodiments, as illustrated by FIG. 5, a spreading ring 72 may be inserted into a spreading ring slot 74 in both of the fastener head hole 42 and the fastener nut hole 52.

In the embodiment illustrated in FIG. 5, the first end 38 of the split ring 26 and the second end 40 of the split ring 26 can be either clamped together shown by arrow D or spread apart as shown by arrow E thus widening or making smaller the gap 36 in a manner similar to that discussed above with respect to FIG. 4. The fastener head 46 will urge against spreading surface 62 on the spreading ring 72 located in the fastener head hole 42. The nut 50 will urge against the spreading surface 70 on the spreading ring 72 located in the nut hole 52.

Figure 6:
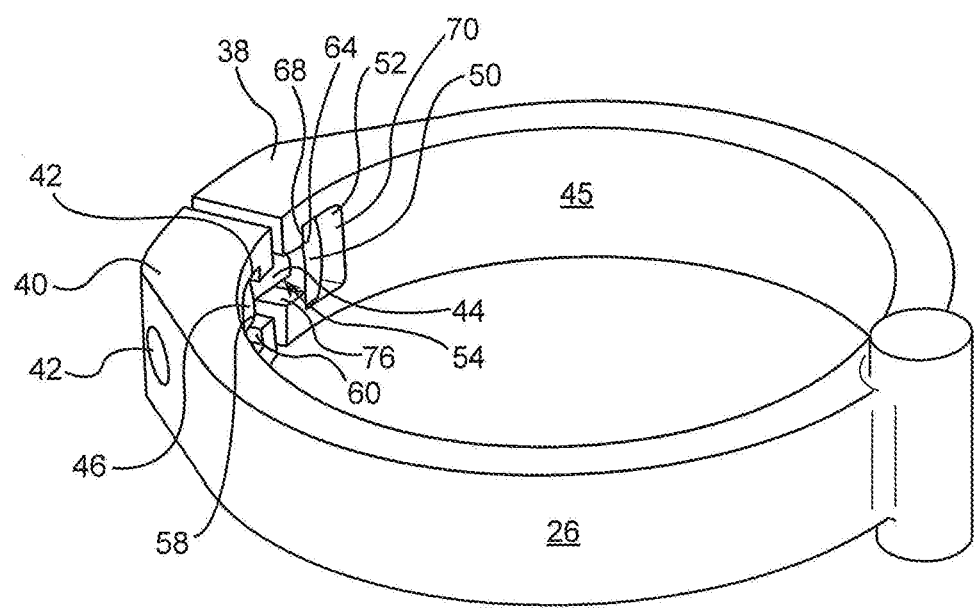
FIG. 6 is a perspective view of a split ring illustrating a method of restraining the fastener in accordance with the present disclosure.
Figure 7:
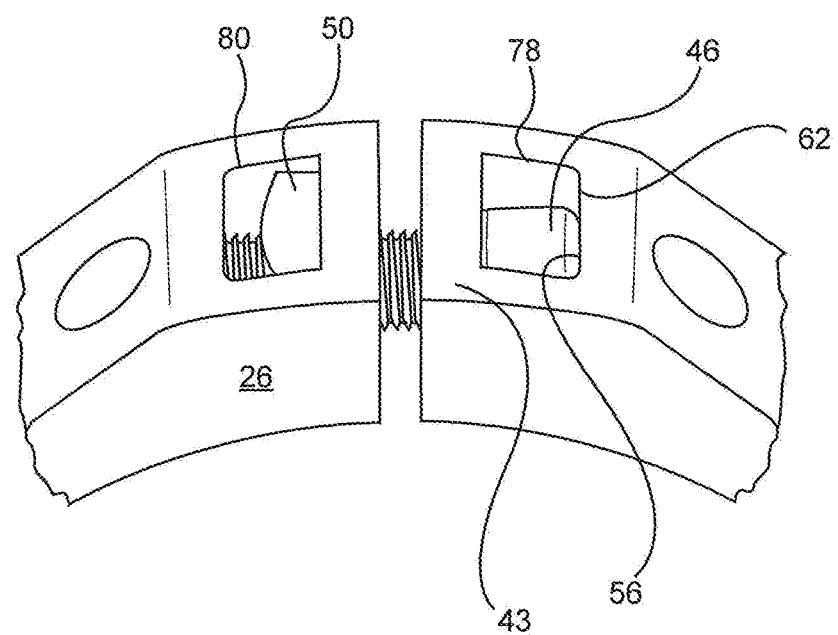
FIG. 7 is a partial, perspective view of a split ring illustrating a method of restraining the fastener in accordance with an embodiment of the present disclosure.

FIGS. 6 and 7 illustrate yet another embodiment where the fastener 44 is enclosed by the first end 38 of the split ring 26 and the second end 40 of the split ring 26, the fastener 44 and nut 50 slide sideways into the fastener head hole 42, shaft 54 of the fastener nut hole 52, and the fastener slot 76.

The openings for the fastener head hole 42, fastener nut hole 52, and fastener slot 76 are selected to be in the inner surface 45 of the split ring 26 in order to help the fastener 44 stay in place when the split ring 26 is located on a nozzle 22 not shown in FIG. 6 or 7.

In the embodiment shown in FIGS. 6 and 7, the first end 38 of the split ring 26 and the second end 40 of the split ring 26 can be moved closer together or spread further apart. Similar to the embodiment shown in FIGS. 3 and 4, by turning the fastener 44 with respect to the fastener nut 50, the spreading surface 56 of the fastener head 46 can urge against the spreading surface 62 of the fastener head hole 42 and the spreading surface 66 of the nut 50 can urge against the spreading surface 70 of the fastener nut hole 52 in order to spread the first end 38 of the split ring 26 away from the second end 40 of the split ring 26.

Similarly, by turning the fastener 44 the other way, the clamping surface 64 of the nut 50 urges against the clamping surface 68 of the fastener nut hole 52 and the clamping surface 58 of the fastener head 64 urges against the clamping surface 60 of the fastener nut hole 42 to urge the first end 38 of the split ring 26 toward the second end 40 of the split ring 26.

In the embodiment shown in FIGS. 6 and 7, the visual hole 78 and hole 80 may allow a user to see the fastener head 46 and nut 50 when the split ring 26 is located on a nozzle 22. In some embodiments, the openings 78 and 80 aid in investment cast manufacture. Access to the fastener 46 is provided in the shaft opening 42 shown in FIG. 6.

Figure 8:
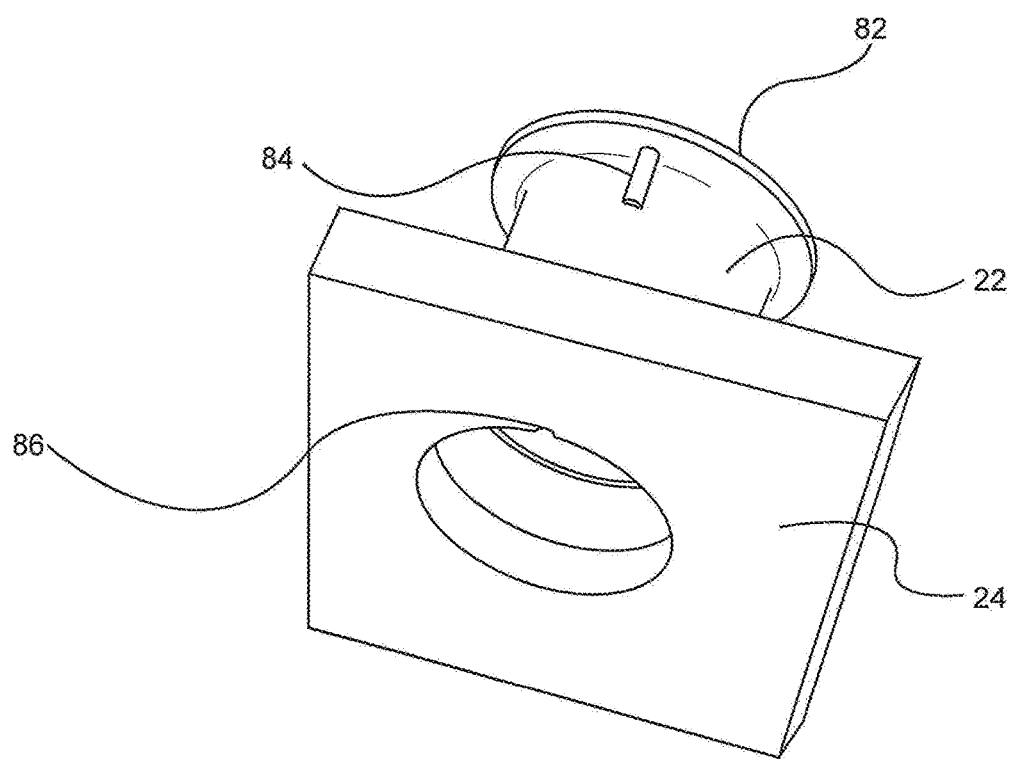
FIG. 8 is a partial, perspective, exploded view of a nozzle being attached to a heat exchanger in accordance with another embodiment of the present disclosure.

FIG. 8 illustrates an embodiment having a raised rib 84 that is located on the nozzle 22. A flange 82 is not limited to the embodiment shown in FIG. 8, but may be used in many embodiments including the example embodiments described herein.

Figure 9:
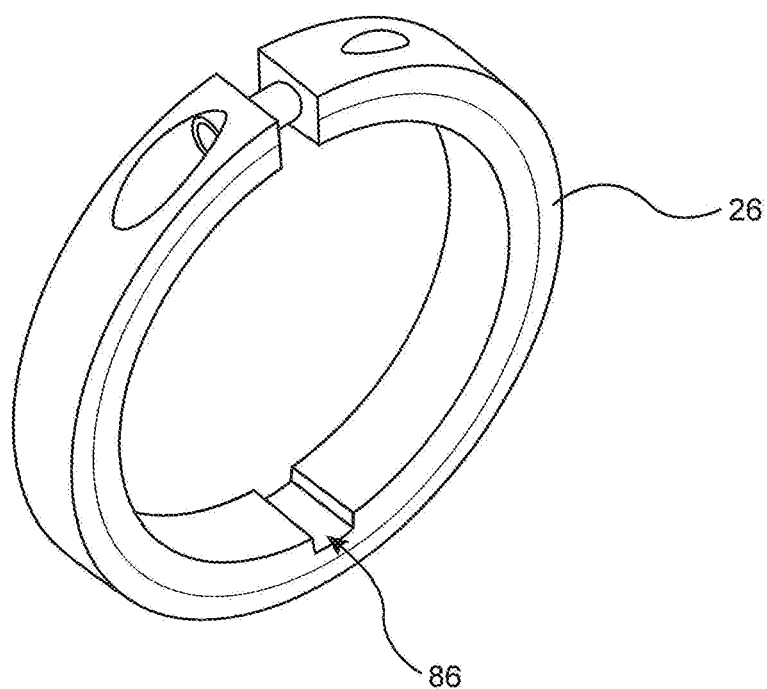
FIG. 9 is a perspective view of a split ring in accordance with another embodiment of the present disclosure.

A trench 86 in the plate 24 is formed so that when the nozzle 22 is installed into the plate 24 the raised rib 84 fits into the trench 86. The trench 86 may be generally rectangular in section as illustrated in FIG. 9, conforming to the section of the raised rib 84 as illustrated in FIG. 8 or other suitable section. As shown in FIG. 9, a trench 86 may be located in the split ring 26 with any of the above mentioned sections. The split ring 26 may then be fitted over the nozzle 22 on a side of the plate 24 opposite the flange 82. Alternatively, the raised rib 84 may be sized such that it is equal to or shorter than the thickness of the slab 24, thus avoiding the need for a trench in the split ring 26.

The combination of the flange 82, the raised rib 84 residing within the trench 86, the shaft of the nozzle 22, and the split ring as shown in FIG. 9 being fit over the nozzle 22 on the side of the plate 24 opposite of the flange 82 results in the nozzle 22 resisting the forces illustrated by arrows A, B and C described above with respect to FIG. 1.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:
1. A split ring comprising:
   a split ring body, the body having a first end and a second end;
   a first fastener hole defined by the first end of the split ring;
   a second fastener hole defined by the second end of the split ring;
   a gap defined by the first and second ends approaching each other wherein the first fastener hole and the second fastener hole are aligned to permit a fastener to extend through the first fastener hole, across the gap and through the second fastener hole;
   a protrusion extending beyond the body of the split ring, the protrusion being located on the body opposite the gap; and
   a first recess located in the first fastener hole and a second recess located in the second fastener hole and the recesses are configured to allow an insert to be placed into each recess.

2. The split ring of claim 1, wherein the protrusion extends axially beyond the body of the split ring.

3. The split ring of claim 2, wherein the protrusion extends axially, in opposing directions beyond the body of the split ring.

4. The split ring of claim 1, wherein the protrusion is integral with the body.

5. The split ring of claim 1, further comprising clamping and spreading surfaces on the first end and clamping and spreading surfaces on the second end located to allow a fastener to urge the split ring closed when the fastener is turned to bear on the clamping surfaces and open the split ring when the fastener is turned to bear on the spreading surfaces.

6. The split ring of claim 1, further comprising a fastener access groove defined by the first and second ends to allow a fastener to slide into the first and second fastener holes.

7. The split ring of claim 6, wherein the access groove is in an inside surface of the split ring.

8. The split ring of claim 1, further comprising a nozzle over which the split ring is fitted and a flange located on an end of the nozzle.

9. The split ring of claim 8, further comprising a heat exchanger attached to the nozzle and the split ring secures the nozzle to the heat exchanger.

10. A split ring comprising:
    a split ring body, the body having a first end and a second end;
    a first fastener hole defined by the first end of the split ring;
    a second fastener hole defined by the second end of the split ring;
    a gap defined by the first and second ends approaching each other where in the first fastener hole and the second fastener hole are aligned to permit a fastener to extend through the first fastener hole, across the gap and through the second fastener hole;
    a protrusion extending beyond the body of the split ring, the protrusion located on the body opposite the gap, wherein the protrusion is integral with the body; and
    a plurality of clamping surfaces defined in each of the first and second ends and a plurality of spreading surfaces defined by the fastener and a fastener nut when the fastener and the fastener nut are inserted into the gap and the clamping surfaces are configured to allow the fastener when turned in a clamping direction to bear on the clamping surfaces to clamp the first and second ends together and the spreading surfaces on the fastener and the fastener nut are configured to allow the fastener, when turned in a spreading direction, to bear against the spreading surfaces to spread the first and second ends of the split ring.

11. The split ring of claim 10, wherein the protrusion extends axially beyond the body of the split ring.

12. The split ring of claim 11, wherein the protrusion extends axially, in opposing directions beyond the body of the split ring.

13. The split ring of claim 10, wherein the protrusion is integral with the body.

14. The split ring of claim 10, further comprising clamping and spreading surfaces on the first end and clamping and spreading surfaces on the second end located to allow a fastener to urge the split ring closed when the fastener is turned to bear on the clamping surfaces and open the split ring when the fastener is turned to bear on the spreading surfaces.

15. The split ring of claim 10, further comprising a fastener access groove defined by the first and second ends to allow a fastener to slide into the first and second fastener holes.

16. The split ring of claim 15, wherein the access groove is in an inside surface of the split ring.

17. The split ring of claim 10, further comprising a nozzle over which the split ring is fitted and a flange located on an end of the nozzle.

18. The split ring of claim 17, further comprising a heat exchanger attached to the nozzle and the split ring secures the nozzle to the heat exchanger.

* * * * *